United States Patent
Simpson et al.

(10) Patent No.: US 7,647,158 B2
(45) Date of Patent: Jan. 12, 2010

(54) APPARATUS AND METHOD FOR DIAGNOSING AN AIRFLOW MODIFYING CONTROL SYSTEM

(75) Inventors: Kenneth M. Simpson, Swartz Creek, MI (US); Peter H. Maehling, Brighton, MI (US)

(73) Assignee: Delphi Technologies, Inc., Troy, MI (US)

( * ) Notice: Subject to any disclaimer, the term of this patent is extended or adjusted under 35 U.S.C. 154(b) by 258 days.

(21) Appl. No.: 11/871,377

(22) Filed: Oct. 12, 2007

(65) Prior Publication Data

US 2008/0091330 A1    Apr. 17, 2008

Related U.S. Application Data

(60) Provisional application No. 60/829,524, filed on Oct. 13, 2006.

(51) Int. Cl.
*G06F 11/30* (2006.01)
*G06F 19/00* (2006.01)
*G01M 19/00* (2006.01)

(52) U.S. Cl. .................. 701/103; 701/114; 702/183; 73/114.32

(58) Field of Classification Search ......... 701/101–103, 701/110, 114, 115; 123/396, 399, 400, 403; 60/274, 285; 73/114.31–114.37; 702/50, 702/182, 183, 185
See application file for complete search history.

(56) References Cited

U.S. PATENT DOCUMENTS

| | | | | |
|---|---|---|---|---|
| 5,235,951 A | * | 8/1993 | Taguchi et al. | 123/399 |
| 5,889,405 A | * | 3/1999 | Yanai et al. | 324/522 |
| 6,024,059 A | * | 2/2000 | Kamimaru et al. | 123/90.11 |
| 6,662,780 B2 | * | 12/2003 | Yook | 123/399 |
| 6,945,226 B2 | | 9/2005 | Yu et al. | |

\* cited by examiner

*Primary Examiner*—Willis R Wolfe, Jr.
(74) *Attorney, Agent, or Firm*—Thomas N. Twomey (57) ABSTRACT

An apparatus and method for diagnosing an airflow control system of an internal combustion engine, the method comprising: determining if a valve is in a stable position; commanding the valve of the airflow control system to move from a first position to a second position; determining a period of time for the valve to move from the first position to the second position; providing a first signal if the period of time is greater than or less than a predetermined period of time, the predetermined period of time corresponding to an amount of time necessary to move the valve from the first position to the second position under predetermined conditions; and providing a second signal if the period of time is within a range defined by the predetermined period of time.

15 Claims, 5 Drawing Sheets

APPARATUS AND METHOD FOR DIAGNOSING AN AIRFLOW MODIFYING CONTROL SYSTEM

CROSS REFERENCE TO RELATED APPLICATIONS

The present invention claims the benefit of U.S. Provisional Patent Application Ser. No. 60/829,524, filed on Oct. 12, 2006, the contents of which are incorporated herein by reference thereto.

BACKGROUND

This present invention relates generally to airflow control systems and more particularly to an apparatus and method for diagnosing the system.

In order to adjust the fluid flow or air flow in the intake manifold of internal combustion engine movable valves (e.g., intake and exhaust valves) are provided to adjust the fluid flow dynamics. As is known in the related arts the intake and exhaust valves are positioned to periodically open and close during operation of the engine. These valves are opened and closed according to the operational state of the engine as well as commanded states via an engine control module or unit (ECM or ECU).

In addition it is also desirable to provide a diagnostic system, which may be able to detect degradation of the valve system or a particular valve. One possible failure mode of such a valve system may include damage to movable linkage members or devices operably coupled between a driving device such as a motor and the valve itself. In this instance a motor may appear to be operating within predetermined tolerance however, the valve may not be operating or moving properly due to damage in the linkage members.

Accordingly, it is desirable to provide an apparatus and method for diagnosing an airflow control system wherein the operational state of the linkage is detectable.

SUMMARY OF THE INVENTION

The present invention relates to an apparatus and method for diagnosing an airflow control system of an internal combustion engine, the method comprising: determining if a valve is in a stable position; commanding the valve of the airflow control system to move from a first position to a second position; determining a period of time for the valve to move from the first position to the second position; providing a first signal if the period of time is greater than or less than a predetermined period of time, the predetermined period of time corresponding to an amount of time necessary to move the valve from the first position to the second position under predetermined conditions; and providing a second signal if the period of time is within a range defined by the predetermined period of time.

Exemplary embodiments of the present invention also relate to a storage medium encoded with machine readable computer program code for diagnosing an airflow control system of an internal combustion engine, the storage medium including instructions for causing a computer to implement a method comprising: determining if a valve is in a stable position; commanding the valve of the airflow control system to move from a first position to a second position; determining a period of time for the valve to move from the first position to the second position; providing a first signal if the period of time is greater than or less than a predetermined period of time, the predetermined period of time corresponding to an amount of time necessary to move the valve from the first position to the second position under predetermined conditions; and providing a second signal if the period of time is within a range defined by the predetermined period of time.

In another exemplary embodiment, an airflow control system for an internal combustion engine having an intake manifold and a plurality of movable valves disposed in the intake manifold is provided, the system comprising: a microprocessor in operable communication with the plurality of movable valves; a storage medium encoded with machine readable computer program code for diagnosing the airflow control system, the storage medium including instructions for causing the microprocessor to implement a method comprising: determining if a valve of the plurality of valves is in a stable position; commanding the valve to move from a first position to a second position; determining a period of time for the valve to move from the first position to the second position; providing a first signal if the period of time is greater than or less than a predetermined period of time, the predetermined period of time corresponding to an amount of time necessary to move the valve from the first position to the second position under predetermined conditions; and providing a second signal if the period of time is within a range defined by the predetermined period of time.

DETAILED DESCRIPTION OF EXEMPLARY EMBODIMENTS

The disclosure of the present invention relates to an apparatus and method for diagnosing an airflow control system of an internal combustion engine, the method comprising: determining if a valve is in a stable position; commanding the valve of the airflow control system to move from a first position to a second position; determining a period of time for the valve to move from the first position to the second position; providing a first signal if the period of time is greater than or less than a predetermined period of time, the predetermined period of time corresponding to an amount of time necessary to move the valve from the first position to the second position under predetermined conditions; and providing a second signal if the period of time is within a range defined by the predetermined period of time.

Non limiting examples of the valves in the airflow systems being diagnosed by exemplary embodiments of the present invention include charge motion control valves (CMCV) and swirl control valves (SCV), each of which are configured to adjust the intake flow swirl or tumble, thereby changing combustion characteristics of the internal combustion engine.

In accordance with an exemplary embodiment of the present invention the valves are controlled via an electric motor with position feedback. This position, or angle, feedback value of the valve can then be used to diagnose the valve system.

Figure 1:
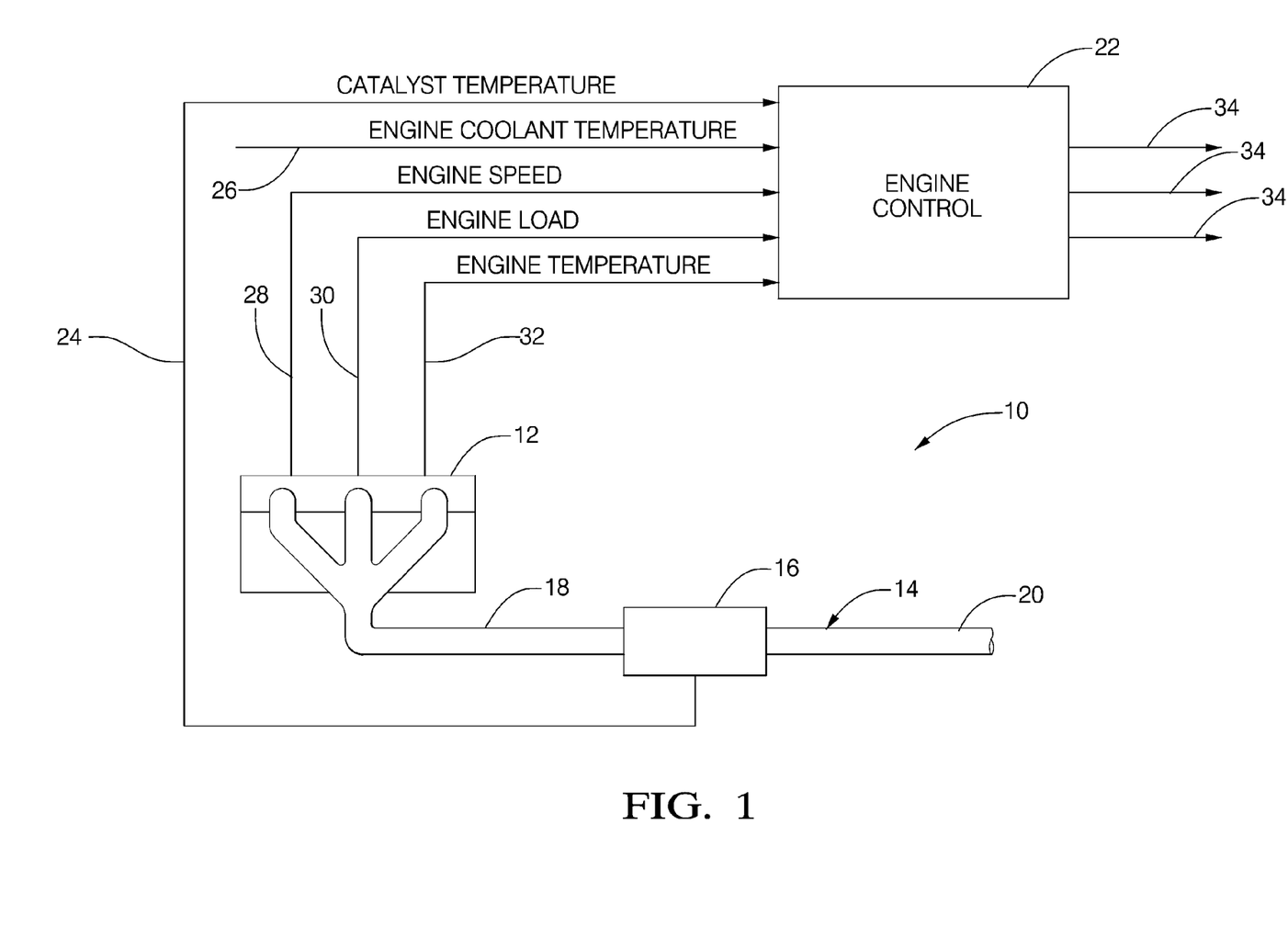
FIG. 1 is a schematic illustration of an engine control module and an intake and exhaust system component.

Referring now to FIG. 1 a non-limiting example of an exhaust control system 10 is illustrated. The exhaust control system comprises a controller or an engine control module (ECM) 22. Engine control module 22 comprises among other elements a microprocessor for receiving signals indicative of the vehicle performance as well as providing signals for control of various system components, read only memory in the form of an electronic storage medium for executable programs or algorithms and calibration values or constants, random access memory and data buses for allowing the necessary communications (e.g., input, output and within the ECM) with the ECM in accordance with known technologies.

In accordance with an exemplary embodiment the controller will comprise a microcontroller, microprocessor, or other equivalent processing device capable of executing commands of computer readable data or program for executing a control algorithm. In order to perform the prescribed functions and desired processing, as well as the computations therefore (e.g., the control processes prescribed herein, and the like), the controller may include, but not be limited to, a processor (s), computer(s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces. As described above, exemplary embodiments of the present invention can be implemented through computer-implemented processes and apparatuses for practicing those processes.

The ECM receives various signals from various sensors in order to determine the state of the engine as well as vary the operational state and perform diagnostics for example, the ECM can determine whether the engine is being started in a "cold start" state as well as perform and/or control other vehicle operations. Some of the sensors which provide input to the ECM include but are not limited to the following: engine coolant temperature 26, engine speed 28, engine load 30, engine temperature 32 and engine air/fuel ratio obtained by an exhaust system sensor 24. The sensors used may also be related in part to the type of engine being used (e.g., water cooled, air cooled, diesel, gas, hybrid, etc.). Exhaust system sensor 24 may be a catalyst temperature probe 24 or other equivalent means or method for measuring the converter temperature.

In accordance with operating programs, algorithms, look up tables and constants resident upon the microcomputer of the ECM various output signals 34 are provided by the ECM. These signals can be used to control the engine (e.g., limiting or shutting off fuel flow as well as closing or opening the intake and exhaust valves of the engine) as well as performing other vehicle operations including but not limited to: fuel/air flow control to maintain optimum, lean or rich stoichiometry as may be required to provide the required torque output; spark timing; engine output; and providing on board malfunctioning diagnostic (OBD) means to the vehicle operator. As is known in the related arts and as used herein "lean" is meant to include engines that can be operated with an inlet oxygen concentration greater than the amount required for stoichiometric (or chemically correct) combustion of a hydrocarbon fuel whereas "rich" is meant to include engines operated with a greater amount of fuel.

Figure 2:
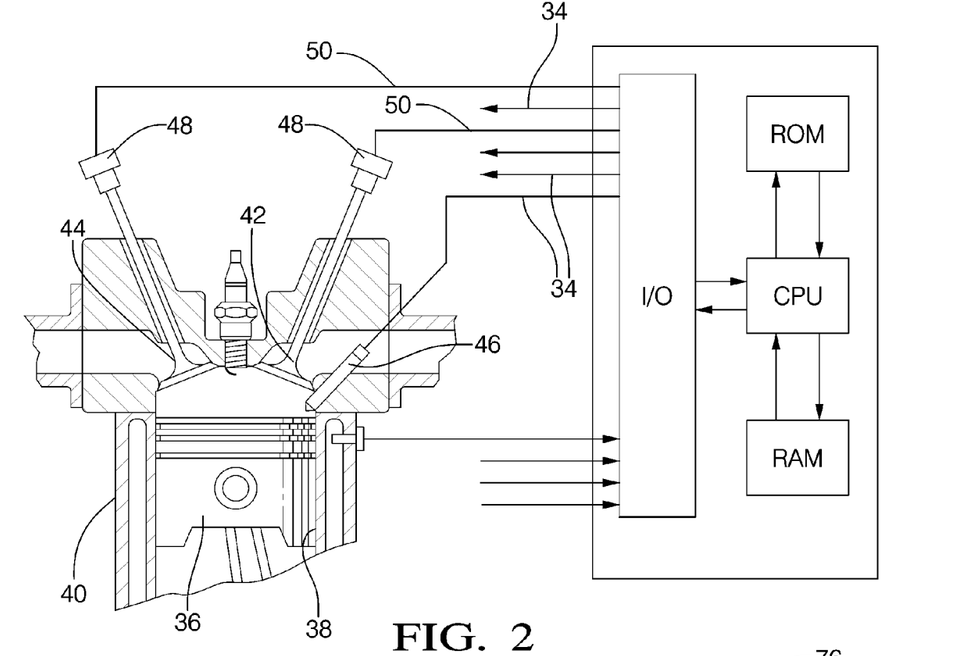
FIG. 2 is a schematic illustration of a portion of an internal combustion engine.

Referring now to FIG. 2 a non-limiting partial schematic illustration of a cylinder of an engine and the ECM is provided. For ease of explanation only cylinder is shown of course, it is contemplated that the ECM may control many cylinders as well as valves associated therewith.

As is known in the related arts of internal combustion engines a piston 36 moves within a cylinder 38 of an engine block 40 of the engine, the engine may comprise any number of cylinders (e.g., 2, 4, 6, 8, 10, 12, etc.). For each cylinder there is an intake valve 42 and an exhaust valve 44. As is known in the related arts the intake and exhaust valves are positioned to periodically open and close during operation of the engine. In addition, a means 46 (e.g., fuel injector or equivalent thereof) for supplying fuel for the combustion operation is provided, in one non-limiting exemplary embodiment the means is located proximate to the intake valve. The fuel injector is of varying the amount of fuel supplied to the engine by receiving a signal from the ECM, which uses control logic (e.g., engine load, rpm) to vary the amount of fuel supplied to the cylinder. Also, the location of the fuel injector may vary for example the fuel injector may be positioned to supply fuel into the intake chamber as opposed to the combustion chamber as illustrated in FIG. 2.

In accordance with an exemplary embodiment actuatable devices 48 are positioned to provide the necessary movement of the intake and exhaust valves or as will be discussed herein provide the necessary force to retard the movement of the valves. The actuating devices are also controllable through signals received from the ECM via signal lines 50. Actuating devices 48 may be electromechanical devices such as solenoids or equivalents thereof wherein movement of the intake and exhaust valves is controllable from signals received from the ECM.

The ECM has look up tables corresponding to particular engine operations for different operating states, timing intake and exhaust valves, fuel injection and ignition. In addition, the look up tables of the ECM are configured for the particular engine (e.g., diesel, gas, 4, 6. 8 cylinders, etc.).

As discussed above, operation of the engine is determined by the ECM, which receives a plurality of signals corresponding to air/fuel ratio 24, engine coolant temperature 26, engine speed 28, engine load 30, and engine temperature 32. The ECM is a microcomputer comprising a microprocessor, input/output ports, read only memory in the form of an electronic storage medium for executable programs or algorithms and calibration values or constants, random access memory, as well as data buses for allowing the necessary communications within ECM in accordance with known technologies.

Figure 3:
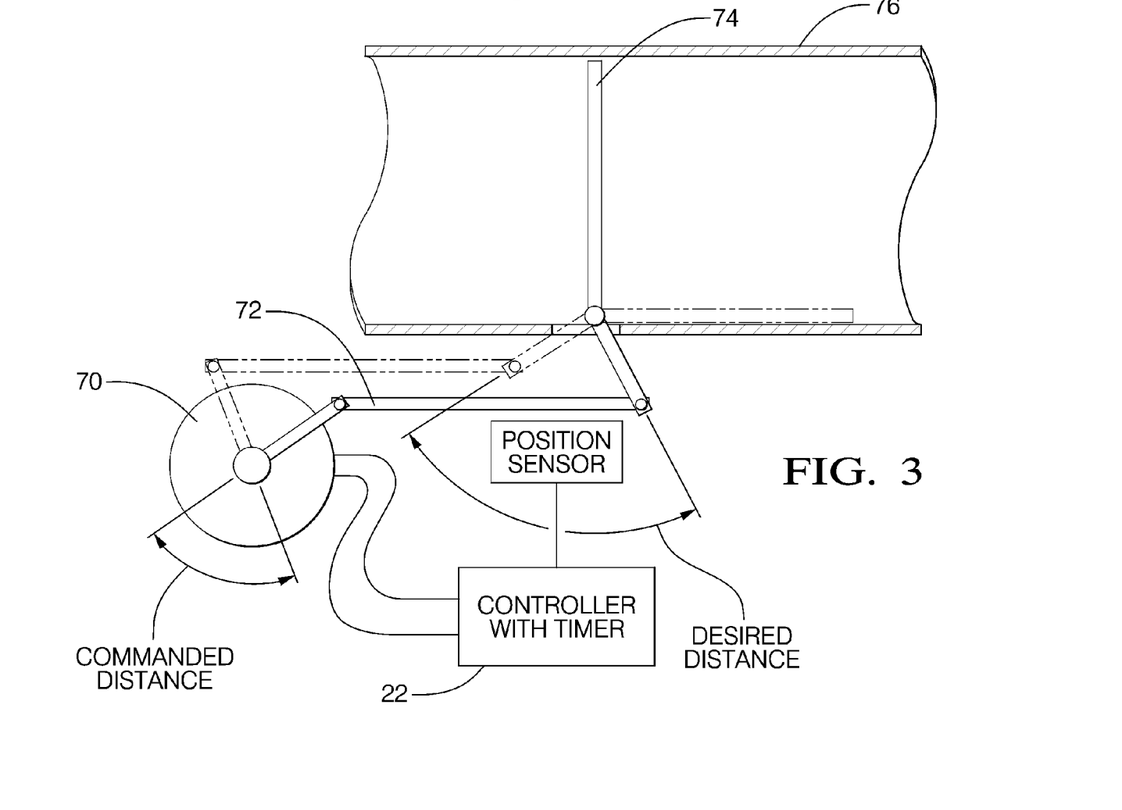
FIG. 3 is a schematic illustration of a portion of an intake manifold of an internal combustion engine.

Referring now to FIG. 3 a partial schematic of airflow control system in accordance with an exemplary embodiment of the present invention is illustrated. Here the ECM is in operable communication with a motor 70 or other equivalent driving device for manipulating a plurality of linkage members 72 operably coupled to a valve member 74 movably mounted in an intake manifold 76 of an engine. Other devices for manipulating the plurality of linkage members include but are not limited to electric motors, vacuum actuators, hydraulic actuators, electromagnetic actuators, solenoids, piezoelectric devices and equivalents thereof. Although a single valve member is shown it is understood that airflow systems will comprise numerous valves and configurations and the present is not intended to be limited the specific design illustrated. In addition, the configuration and number of the linkage members may also vary.

In addition, to standard operation of the engine, a control algorithm of the ECM will have a routine to determine whether a valve control diagnostic is to be performed. In accordance with an exemplary embodiment of the present invention and if the control algorithm of the ECM is performing the diagnostic, the control algorithm will command the valve to move from a first position to a second position and determine a period of time for the valve to move from the first position to the second position. In accordance with an exemplary embodiment the first position and second position corresponds to an open and closed position of the valve although other positions are contemplated to be within the scope of exemplary embodiments of the present invention. Thereafter a first signal will be provided if the period of time is greater than or less than a predetermined period of time, the predetermined period of time corresponding to an amount of time necessary to move the valve from the first position to the second position under predetermined conditions or normal operating conditions (e.g., manufacturing standards). In addition, a second signal will be provided if the period of time is within a range defined by the predetermined period of time, the range having an upper limit and a lower limit.

In accordance with an exemplary embodiment, the time period is measured via a clock of the microprocessor of the ECM. Here and when the command is given to energize the motor, solenoid or other actuation device, the clock will start thereafter, and when the valve has reached its maximum point of travel the end of the time period will be determined. A non-limiting example of a method for determining the stop point or end of travel is through the use of position sensors to measure movement of the linkage and/or valve and/or by monitoring the current applied to the motor (e.g., higher currents being associated with a limit of travel being reached that is the motor continues to try and move the valve or linkage against a stop and thus the applied current in the motor increases). A non-limiting example of the position sensor is a Hall effect device wherein changes in a magnetic field of a magnet are detected wherein either the Hall effect device or the magnet is mounted on the moving member and the other item is stationary. Other non-limiting examples of sensors providing suitable signals of valve or valve component movement include, force sensors, optical sensors, strain gages, linear movement sensors, inductance sensors, each of which is configured to provide a signal to the controller, which is indicative of the movement of the valve or a component for moving the valve, wherein the monitored movement of the valve is comparable to predetermined values indicative of proper operation.

In addition, and in accordance with another exemplary embodiment of the present invention the control algorithm of the ECM is also configured to monitor the distance at least one of the linkage members travels when the valve is moved from the first position to the second position or alternatively the ECM monitors the distance one of the linkage members travels when the valve moves from one known position to another known position. In this embodiment a third signal is provided if the distance is greater or less than a predetermined range, wherein the predetermined range corresponds to distances necessary to move the valve from the first position to the second position or other known positions under predetermined conditions, the predetermined range having an upper limit and a lower limit. If the distance is greater or less than a predetermined range a fail signal will be provided. Again, the predetermined distances correspond to normal operating conditions (e.g., manufacturing standards indicating proper movement of the valve). In addition, a fourth signal will be provided if the distance is within the predetermined range.

In accordance with an exemplary embodiment, the distance traveled is measured through the use of position sensors to measure movement of the linkage and/or valve and/or the motor itself. It being understood that the position sensors are configured to provide signals indicative of the movement of the valve. Accordingly, the location of the position sensors may vary as long as the movement of the valve or valve component is detected.

Figure 4:
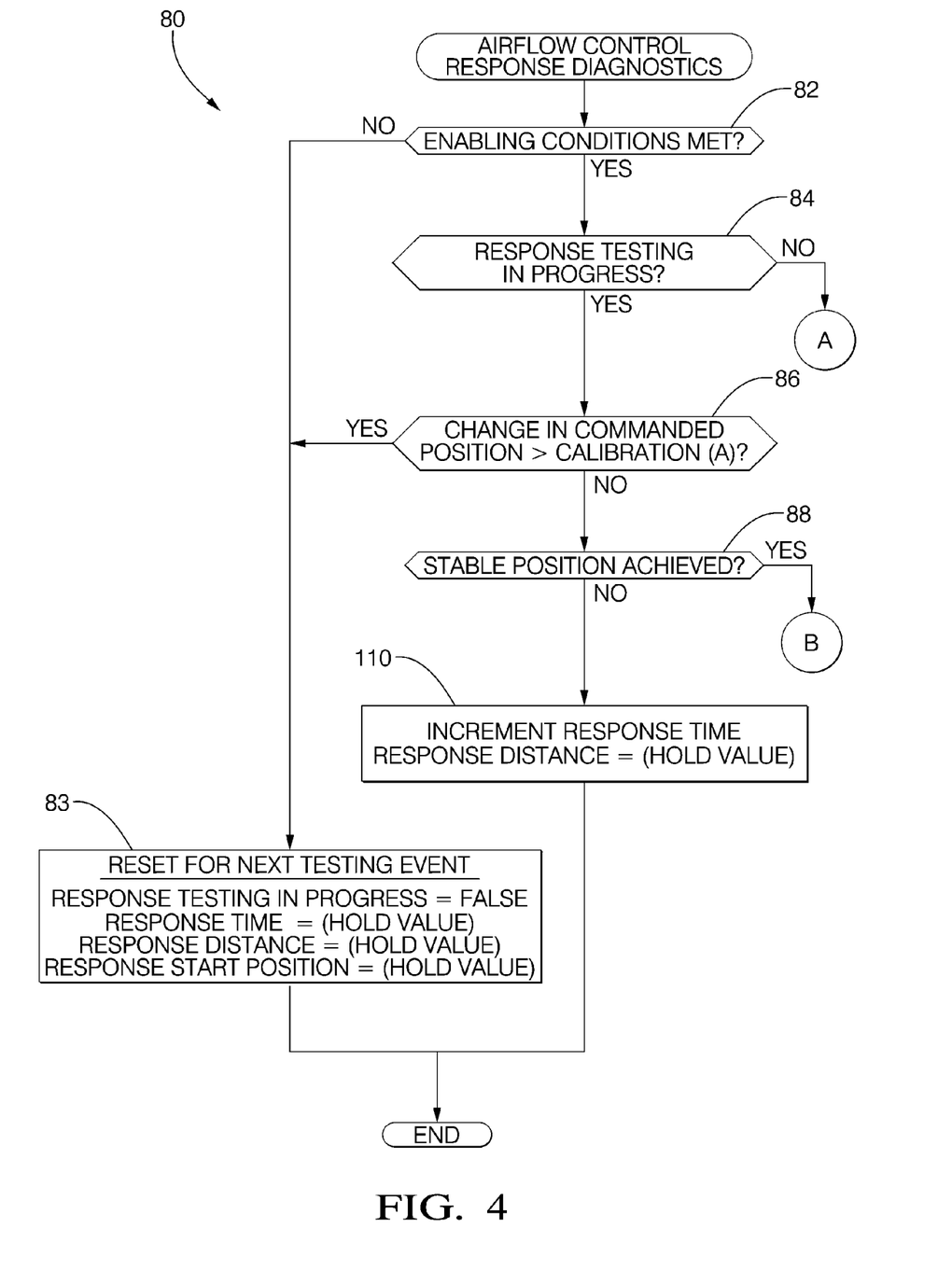
FIGS. 4-6 are a schematic illustration of a flow chart illustrating portions of a control algorithm contemplated for use in exemplary embodiments of the present invention.
Figure 5:
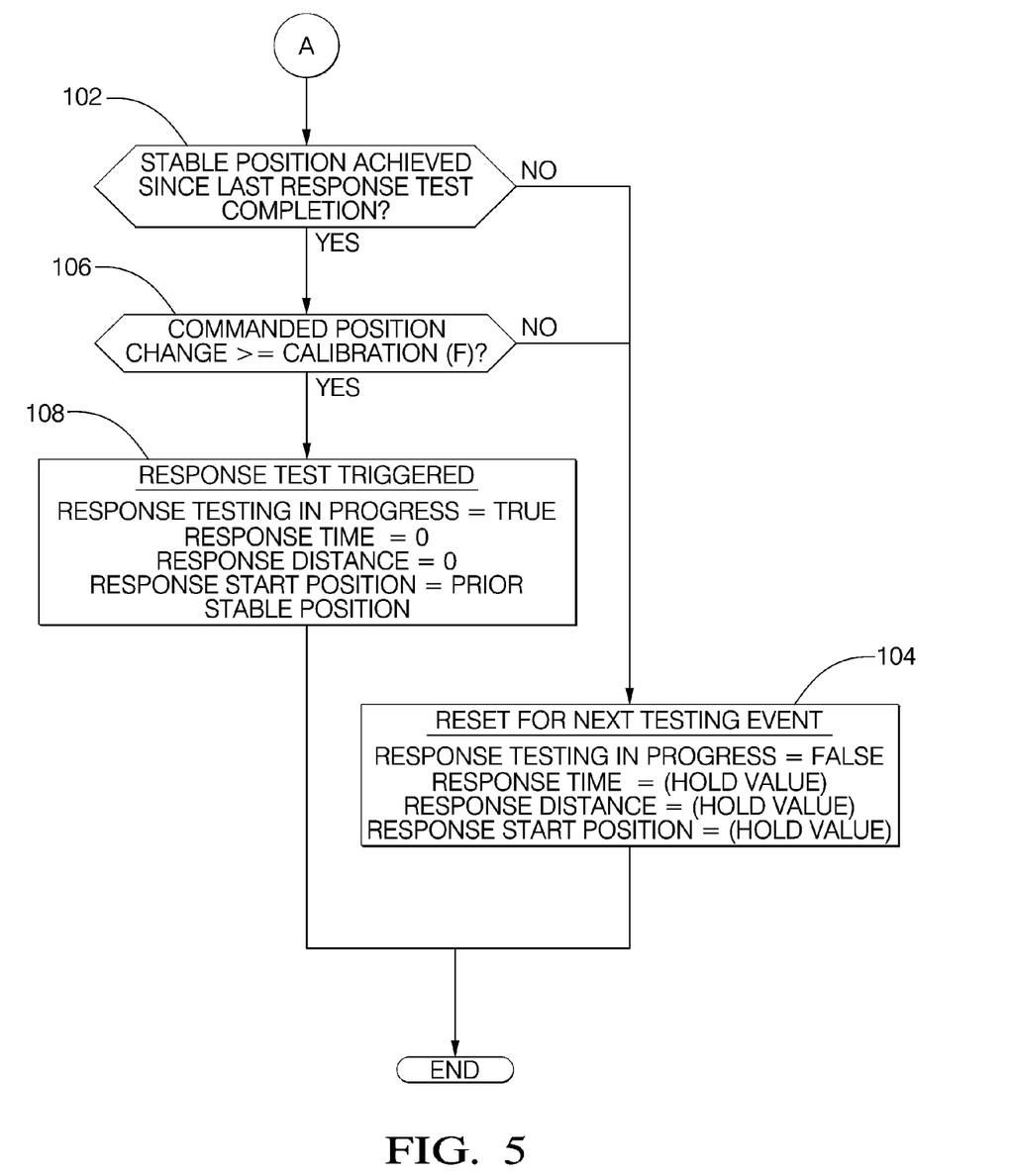
Figure 6:
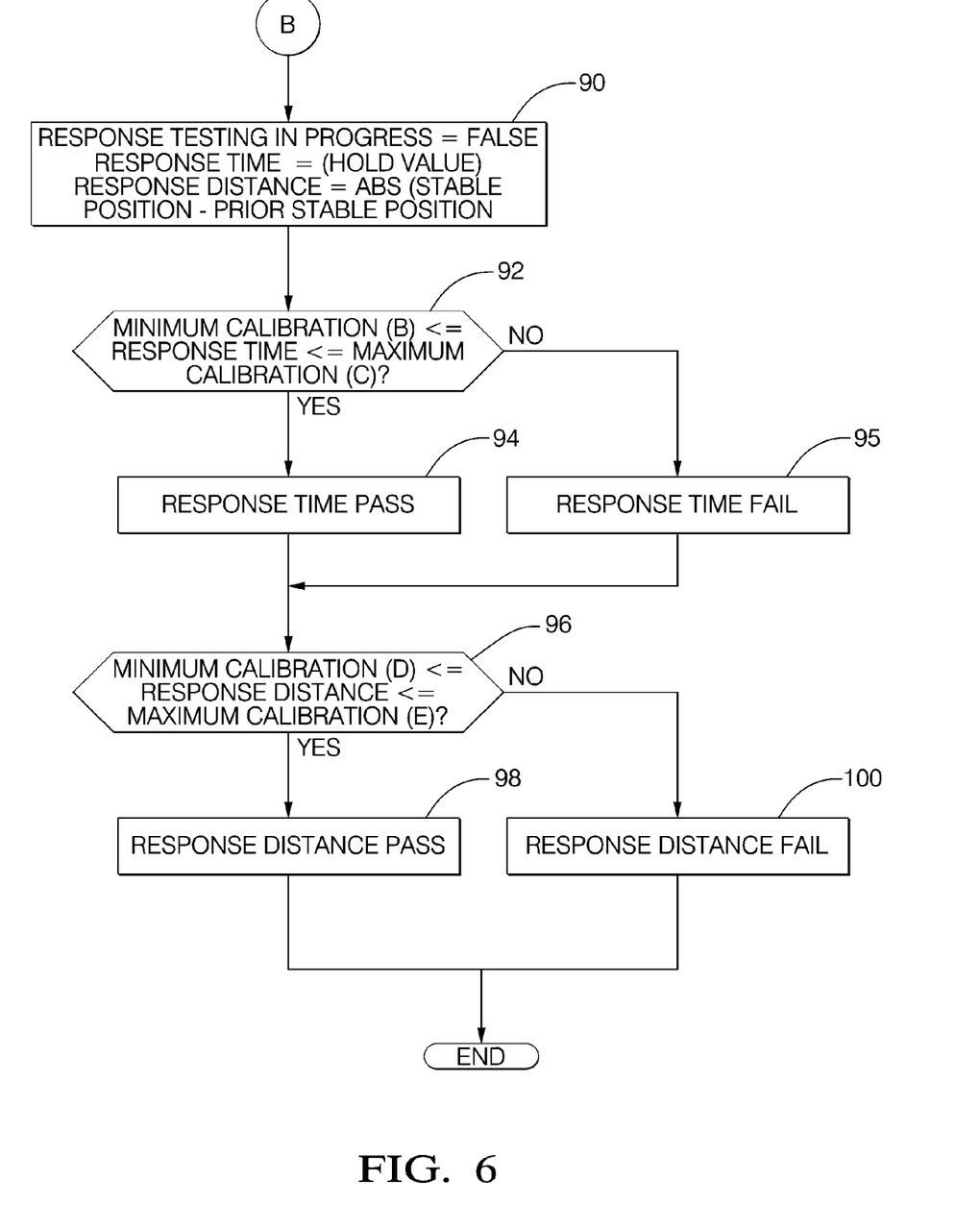

Referring now to FIGS. 4-6, a flow chart 80 illustrating portions of a control algorithm in accordance with an exemplary embodiment of the present invention is illustrated. Here control algorithm 80 at step 82 determines if a diagnostic is to be performed by for example determining if enabling conditions have been met. One non-limiting example of enabling conditions is that the valve is in a stable position (e.g., not currently moving). If not, the algorithm at box 83 resets variables in the algorithm and the algorithm waits for the next testing event. Non-limiting variables are identified in box 83, of course, additional variables may be included or excluded from box 83.

If on the other hand the enabling conditions have been met the algorithm at decision node 84 determines if a test/diagnostic is in progress (e.g., the valve movement is being monitored). This decision node (84) is used to by-pass the enable criteria for initiation of the test. Therefore, when the condition of this node is met, the enable conditions had been met on a prior occasion, but now they do not matter to the evaluation, since the algorithm is now monitoring the movement (time, distance) of the device. If so, the control algorithm commands the valve to move from a stable position to another position (e.g., first known position to a second known position) wherein the distance the valve moves or the distance of some component associated with the movement of the valve moves is measured via a sensing device and a signal indicative of travel is set back to the controller comprising the algorithm and the decision node 86 determines if the change in the commanded position (distance traveled) is greater than a calibration distance (e.g., distance traveled is measured and then compared to a calibration distance). If the measured distance is greater than the calibration distance, the algorithm at box 83 resets variables in the algorithm and then the algorithm waits for the next testing event.

If on the other hand, the commanded position is less than a calibration or predetermined range, a decision node 88 determines if a stable position of the valve being tested has been achieved. In accordance with an exemplary embodiment, the stability of the valve movement is based on first allowing the actuator to begin movement, and then looking for the rate of change of the position sensor signal to reduce below a predetermined stability criteria to determine if a stable position has been achieved.

If a stable position of the valve has been achieved, the algorithm at box 90 resets variables in the algorithm (non-limiting variables are identified in box 90, additional variables may be included or excluded from box 90) and then the algorithm performs another part of the diagnostic by determining a period of time required to move the valve to a commanded position. This is represented by decision node 92 wherein the algorithm commands the valve to move from a known position to another known position and determines the period of time (response time) to perform this movement and decision node 92 performs steps to compare the measured time or response time to a predetermined time period defined by a minimum calibration B and a maximum calibration C. Note, the distance traveled may be the same commanded distance in node 86 or may be another distance. If the response time is less than or equal to a predetermined value (e.g., a maximum calibration) and greater than or equal to a predetermined value (e.g., a minimum calibration), namely within a range of time for this movement box 94 provides a pass indicator. Alternatively, a fail indicator 95 is provided if the response time is greater than a maximum predetermined value or less than a minimum predetermined value (e.g., a range) for this movement.

Then the algorithm commands the valve to move wherein decision node 96 determines if the distance the valve moves in response to the commanded position is within a predetermined range defined by a minimum distance traveled and a maximum distance traveled. This may be the same distances traveled for node 92 or this may be a separate command wherein the valve is moved again after step 92. If so, the algorithm at step 98 provides a pass indicator to update the variables and the test ends.

On the other hand and if decision node 96 determines that the response distance is outside of the predetermined range the algorithm at step 100 provides a fail indicator to update the variables and the test ends.

Referring back now to decision node 84, if the response is "NO" the algorithm will determine if a stable position of the valve had been achieved since the last test, this is indicated by decision node 102. If a stable position of the valve has not been achieved since the last test, the algorithm at box 104 resets variables in the algorithm and then the algorithm ends. Non-limiting variables are identified in box 104, of course, additional variables may be included or excluded from box 104. On the other hand and if node 102 determines that a stable position has been achieved, the algorithm commands the valve to move and decision node 106 determines if the commanded position change is greater than or equal to a calibration constant.

If not, the algorithm at box 104 resets variables in the algorithm and then the algorithm ends. On the other hand, if decision node 106 determines if the commanded position is greater than or equal to a calibration constant the algorithm at box 108 resets variables in the algorithm and then the algorithm ends. Non-limiting variables are identified in box 108, of course, additional variables may be included or excluded from box 108.

As illustrated and in accordance with an exemplary embodiment, calibrations A and F (decision nodes 86 and 106) are separate values however, in an alternative embodiment they are same value. However and in accordance with an exemplary embodiment, calibration A comprises a larger value than calibration F. This is due to the fact that in an exemplary embodiment of the present invention there will be a relatively large immediate change in valve position from one commanded position to another commanded position.

Referring back now to decision node 88 and if the stable position is not achieved, box 110 updates the variables in the algorithm and then the algorithm ends.

In accordance with an exemplary embodiment of the present invention the algorithm evaluates the response time and distance movement of a valve, which is commanded to various positions and related information and/or data is fed back to the algorithm, wherein the appropriate information is logged and if any failures are noted the system may provide a visual indicator indicating that the system should be serviced. In accordance with an exemplary embodiment of the present invention, movement and time for movement of the valve, components secured to the valve and/or effecting movement of the valve are sensed and then compared to predetermined or known values to determine whether the airflow modify system is operating in accordance with pre-determined tolerances.

As described herein, valve systems can change the flow pattern of air entering the cylinder of an internal combustion engine used in motor vehicles. This is achieved by manipulating the valve positions. Accordingly, it is desirable to determine if the system is not operating properly and the valves are not opening. In accordance with an exemplary embodiment of the present invention degradation of the system is determined if when the valve is commanded from one known position to another the distance traveled and/or time required for achieving the traveled distance is within predetermined tolerances. In accordance with an exemplary embodiment of the present invention both the time period and a distance traveled during the diagnostic are monitored thus providing a robust diagnostic system for the airflow modifying control system.

Accordingly, a technical effect or effects of exemplary embodiments of the present invention are directed to providing an apparatus and method for diagnosing an airflow control system of an internal combustion engine.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. An airflow control system for an internal combustion engine having an intake manifold and a plurality of movable valves disposed in the intake manifold, the system comprising:
   a microprocessor in operable communication with a drive device for manipulating a position of the plurality of movable valves;
   a storage medium encoded with machine readable computer program code for diagnosing the airflow control system, the storage medium including instructions for causing the microprocessor to implement a method comprising:
   determining if a valve of the plurality of valves is in a stable position;
   commanding the valve to move from a first position to a second position;
   determining a period of time for the valve to move from the first position to the second position;
   providing a first signal if the period of time is greater than or less than a predetermined period of time, the predetermined period of time corresponding to an amount of time necessary to move the valve from the first position to the second position under predetermined conditions, the predetermined period of time having a range defined by an upper limit and a lower limit; and
   providing a second signal if the period of time is within the range defined by the predetermined period of time.

2. The system as in claim 1, wherein the valve is coupled to a device by at least one linkage member, the device being configured for moving the valve from the first position to the second position and wherein the method further comprises:
   monitoring a distance that at least one linkage member travels when the valve is moved from the first position to the second position; and
   providing a third signal if the distance is greater or less than a predetermined range, the predetermined range corresponding to distances necessary to move the valve from the first position to the second position under predetermined conditions; and
   providing a fourth signal if the distance is within the predetermined range.

3. The system as in claim 2, wherein the device is an electric motor.

4. The system as in claim 2, wherein the first position is an open position of the valve and the second position is a closed position of the valve.

5. The system as in claim 2, wherein a position sensor monitors the distance the at least one linkage member travels.

6. A storage medium encoded with machine readable computer program code for diagnosing an airflow control system of an internal combustion engine, the storage medium including instructions for causing a computer to implement a method comprising:
   determining if a valve of the airflow control system is in a stable position;
   commanding the valve of the airflow control system to move from a first position to a second position;
   determining a period of time for the valve to move from the first position to the second position;
   providing a first signal if the period of time is greater than or less than a predetermined period of time, the predetermined period of time corresponding to an amount of time necessary to move the valve from the first position to the second position under predetermined conditions, the predetermined period of time having a range defined by an upper limit and a lower limit; and
   providing a second signal if the period of time is within the range defined by the predetermined period of time.

7. The storage medium as in claim 6, wherein the valve is coupled to a device by at least one linkage member, the device being configured to move the valve from the first position to the second position and wherein the method further comprises:
   monitoring a distance that at least one linkage member travels when the valve is moved from the first position to the second position the valve being coupled to a device by the at least one linkage member, the device being configured to move the valve from the first position to the second position; and
   providing a third signal if the distance is greater or less than a predetermined range, the predetermined range, the predetermined range being defined by an upper limit and a lower limit and corresponds to a distance necessary to move the valve from the first position to the second position under predetermined conditions; and
   providing a fourth signal if the distance is within the predetermined range.

8. The method as in claim 7, wherein the first position is an open position of the valve and the second position is a closed position of the valve and the device is an electric motor.

9. A method for diagnosing an airflow control system of an internal combustion engine, the method comprising:
   determining if a valve of the airflow control system is in a stable position;
   commanding the valve of the airflow control system to move from a first position to a second position;
   determining a period of time for the valve to move from the first position to the second position;
   providing a first signal if the period of time is greater than or less than a predetermined period of time, the predetermined period of time corresponding to an amount of time necessary to move the valve from the first position to the second position under predetermined conditions, the predetermined period of time having a range defined by an upper limit and a lower limit; and
   providing a second signal if the period of time is within the range defined by the predetermined period of time.

10. The method as in claim 9, wherein the first position is an open position of the valve and the second position is a closed position of the valve.

11. The method as in claim 9, wherein the valve is coupled to a device by at least one linkage member, the device being configured to move the valve from the first position to the second position.

12. The method as in claim 11, wherein the device is an electric motor.

13. The method as in claim 11, further comprising:
   monitoring a distance the at least one linkage member travels when the valve is moved from the first position to the second position; and
   providing a third signal if the distance is greater or less than a predetermined range, the predetermined range being defined by an upper limit and a lower limit and corresponds to the distance necessary to move the valve from the first position to the second position under predetermined conditions; and
   providing a fourth signal if the distance is within the predetermined range.

14. The method as in claim 13, wherein the first position is an open position of the valve and the second position is a closed position of the valve.

15. The method as in claim 13, wherein a position sensor monitors the distance the at least one linkage member travels.

* * * * *